(12) United States Patent
Bolshtyansky et al.

(10) Patent No.: US 6,417,959 B1
(45) Date of Patent: Jul. 9, 2002

(54) RAMAN FIBER AMPLIFIER

(75) Inventors: Maxim A. Bolshtyansky, Bound Brook; Paul F. Wysocki, Flemington, both of NJ (US)

(73) Assignee: Onetta, Inc., Sunnyvale, CA (US)

(*) Notice: Subject to any disclaimer, the term of this patent is extended or adjusted under 35 U.S.C. 154(b) by 7 days.

(21) Appl. No.: 09/774,678

(22) Filed: Feb. 1, 2001

Related U.S. Application Data

(60) Provisional application No. 60/250,499, filed on Dec. 4, 2000.

(51) Int. Cl.[7] .................................................. H01S 3/00
(52) U.S. Cl. ....................................................... 359/334
(58) Field of Search ................................ 372/3; 359/334

(56) References Cited

U.S. PATENT DOCUMENTS

| | | | |
|---|---|---|---|
| 4,881,790 A | 11/1989 | Mollenauer | 350/96.16 |
| 5,623,508 A | 4/1997 | Grubb et al. | 372/3 |
| 5,673,280 A | 9/1997 | Grubb et al. | 372/3 |
| 5,959,750 A | 9/1999 | Eskildsen et al. | 359/134 |
| 6,052,393 A | 4/2000 | Islam | 372/6 |
| 6,081,366 A * | 6/2000 | Kidorf et al. | 359/334 |
| 6,088,152 A * | 7/2000 | Berger et al. | 359/124 |
| 6,101,024 A * | 8/2000 | Islam et al. | 359/327 |
| 6,115,174 A | 9/2000 | Grubb et al. | 359/334 |
| 6,147,794 A | 11/2000 | Stentz | 359/334 |
| 6,151,160 A | 11/2000 | Ma et al. | 359/334 |
| 6,163,396 A * | 12/2000 | Webb | 359/327 |
| 6,163,636 A | 12/2000 | Stentz et al. | 385/24 |
| 6,178,038 B1 | 1/2001 | Taylor et al. | 359/341 |
| 6,181,464 B1 | 1/2001 | Kidorf et al. | 359/334 |
| 6,275,313 B1 * | 8/2001 | Denkin et al. | 359/124 |
| 6,335,820 B1 * | 1/2002 | Islam | 359/334 |
| 6,344,922 B1 * | 2/2002 | Grubb et al. | 359/134 |
| 6,356,383 B1 * | 3/2002 | Cornwell et al. | 359/334 |
| 6,356,384 B1 * | 3/2002 | Islam | 359/334 |
| 6,359,725 B1 * | 3/2002 | Islam | 359/334 |
| 2001/0036004 A1 * | 11/2001 | Ackerman et al. | 359/334 |

FOREIGN PATENT DOCUMENTS

| | | | |
|---|---|---|---|
| WO | WO 99/66607 | 12/1999 | |
| WO | WO 00/49721 | 8/2000 | |
| WO | WO 00/73849 A1 | 12/2000 | G02F/1/35 |

OTHER PUBLICATIONS

Zhu et al. "1.28 Tbit/s (32 x40 Gbit/s) Transmission over 1000 km NDSF Employing Distributed Raman Amplification and Active Gain Flattening" Electronics Letters, vol. 37, No. 1, p. 43–45 (Jan. 4, 2001).

Emori et al. "Cost–Effective Depolarization Diode Pump Unit Designed for C–band Flat Gain Raman Amplifiers to Control EDFA Gain Profile" p. 106–108.

Takeda et al. "Active Gain Tilt Equalization by Preferentially 1.43 $\mu$m– or 1.48$\mu$m– Pumped Raman Amplification" OSA Optical Amplifiers and their Applications, vol. 30, p. 101–105 (1999).

Masuda "Review of Wideband Hybrid Amplifiers" 25th Optical Fiber Communication Conference, Technical Digest, p. 2–4, (Mar. 7, 2000).

(List continued on next page.)

*Primary Examiner*—Thomas H. Tarcza
*Assistant Examiner*—Deandra M. Hughes
(74) *Attorney, Agent, or Firm*—Fish & Neave; G. Victor Treyz

(57) ABSTRACT

Raman fiber amplifiers are provided in which multiple pump wavelengths are used. A Raman fiber amplifier may be used to amplify optical signal channels over a range of wavelengths. Some of the pump wavelengths may be selected to create Raman gain in this range. Other pump wavelengths may be selected to create Raman loss in this range. Different pump powers may be used at each pump wavelength.

21 Claims, 4 Drawing Sheets

OTHER PUBLICATIONS

Lewis et al. "Low–Noise High Gain Dispersion Compensating Broadband Raman Amplifier" $25^{th}$ Optical Fiber Communication Conference, Technical Digest, p. 5–7, (Mar. 7, 2000).

Fludger et al. "Inline Loopbacks for Improved OSNR and Reduced Double Rayleigh Scattering in Distributed Raman Amplifiers" OFC.

Stentz "Progress on Raman Amplifiers" OFC '97 Technical Digest, p. 343.

Hansen et al. "Raman Amplification for Loss Compensation in Dispersion Compensating Fibre Modules" Electronics Letters, vol. 34, No. 11, p. 1136–1137, May 28, 1998.

Emori et al. "Broadband Lossless DCF using Raman Amplification Pumped by Multichannel WDM Laser Diodes" Electronics Letters, vol. 34, No. 22, Oct. 29, 1998.

Neilson et al. "10 Gbit/s Repeaterless Transmission at 1.3 µm with 55.1–dB Power Budget using Raman Post and Preamplifier" OFC '98 Technical Digest, p. 52–53.

Stentz et al. "Raman Amplifier with Improved System Performance" OFC '96 Technical Digest, p. 16–17.

Wey et al. Crosstalk Bandwidth in Backward Pumped Fiber Raman Amplifiers. IEEE Photonics Technology Letters, vol. 11, No. 11, Nov. 1999, pp. 1417–1419.*

Seo et al. Compensation of Raman–Induced Crosstalk Using a Lumped Germanosillicate Fiber Raman Amplifier in the 1.571–1.591 micrometer Range. IEEE Photonics Technology Letters, vol. 13, No. 1, Jan. 2001, pp. 28–30.*

Mazurczyk et al. Accumulation of Gain Tilt in WDM Amplified Systems Due to Raman Crosstalk. IEEE Photonics Technology Letters, vol. 12, No. 11, Nov. 2000, pp. 1573–1575.*

Emori et al. 100nm Bandwidth Flat Gain Raman Amplifiers Pumped and Gain–Equalized by 12–Wavelength–Cahnnel WDM High Power Laser Diodes. OFCC, 1999. pp. PD19–1–PD19–3.*

* cited by examiner

RAMAN FIBER AMPLIFIER

This application claims the benefit of provisional patent application No. 60/250,499, filed Dec. 4, 2000.

BACKGROUND OF THE INVENTION

The present invention relates to fiber-optic communications networks, and more particularly, to Raman fiber amplifiers for use in optical communications networks.

In optical networks that use wavelength division multiplexing, multiple wavelengths of light are used to support multiple communications channels on a single fiber. Optical amplifiers are used in such networks to amplify optical signals that have been subject to attenuation over fiber-optic links. A typical amplifier may include erbium-doped fiber amplifier components that are pumped with diode lasers. Raman amplifiers have also been used that provide optical gain through stimulated Raman scattering.

The gain spectrum of a Raman-pumped fiber amplifier that is pumped at a single wavelength is not flat. Unless the gain spectrum of the Raman amplifier is flattened, different wavelengths of light will be amplified by different amounts. This is undesirable, particularly in arrangements in which many amplifiers are cascaded in a communications link.

One way in which to flatten the gain spectrum of a Raman amplifier is to use a gain equalization filter. A gain equalization filter may be inserted in the optical path of the Raman amplifier. The gain equalization filter introduces losses in the portions of the spectrum in which the Raman gain is greatest, thereby flattening the Raman amplifier gain spectrum. However, the use of a gain equalization filter to flatten the Raman gain spectrum may increase the noise figure of the amplifier.

Another way in which to flatten the gain spectrum of a Raman amplifier is to use multiple pump wavelengths. The pump wavelengths may be selected so that the Raman gain peaks produced by each pump wavelength overlap. The overlapping gain peaks produce an overall gain spectrum that is relatively flat, but this may not be the most efficient way in which to generate a desired gain spectrum.

It is an object of the present invention to provide a Raman amplifier that reduces or eliminates the need for gain equalization filters.

SUMMARY OF THE INVENTION

This and other objects of the invention are accomplished in accordance with the present invention by providing Raman fiber amplifiers in which multiple pump wavelengths are used. An amplifier may be used to amplify optical signal channels over a range of wavelengths. Some of the pump wavelengths may be selected to create Raman gain in this range. Other pump wavelengths may be selected to create Raman loss in this range. Different pump powers may be used at each pump wavelength. Using both Raman gain and Raman loss contributions to achieve a given gain spectrum may be more efficient than using pumping schemes that only use Raman gain contributions.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
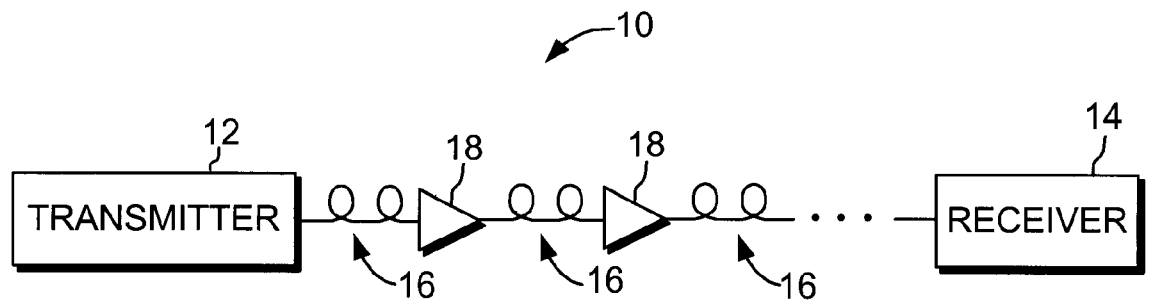
FIG. 1 is a schematic diagram of an illustrative optical communications link using Raman amplifiers in accordance with the present invention.

An illustrative optical communications link 10 that may use Raman-pumped fiber amplifiers is shown in FIG. 1. A transmitter 12 may transmit information to a receiver 14 over a series of fiber links. Each fiber link may include a span 16 of optical fiber. Fiber spans may be on the order of 40–160 km in length for long-haul networks or may be any other suitable length for use in signal transmission in an optical communications network.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1550 nm. These are merely illustrative system characteristics. If desired, more channels may be provided (e.g., hundreds of channels), signals may be modulated at slower or faster data rates (e.g., at approximately 2.5 Gbps for OC-48 or at approximately 40 Gbps for OC-768), and different carrier wavelengths may be supported (e.g., wavelengths in the range of 1280–1625 nm).

Optical amplifier stages 18 may be used to amplify the optical signals between successive spans of fiber 16. Optical amplifier stages 18 may be Raman-pumped fiber amplifiers and may also include one or more rare- earth-doped fiber or waveguide amplifier stages, semiconductor optical amplifier stages, parametric amplifier stages, or any suitable combination of such amplifier stages or other suitable amplifier stages. For purposes of illustration, the present invention will be described primarily in the context of amplifier stages 18 based on Raman-pumped fiber. This is merely illustrative. Stages 18 may use Raman pumping in combination with any other amplification arrangement suitable for amplifying optical signals on a fiber path in a fiber-optic communications link.

Figure 2:
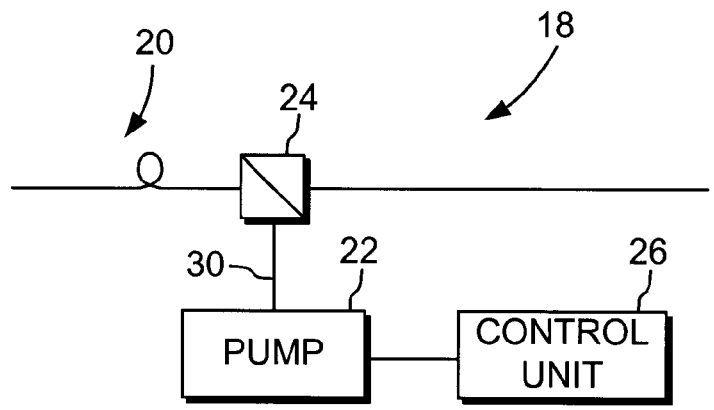
FIG. 2 is a schematic diagram of an illustrative Raman fiber amplifier in accordance with the present invention.

An illustrative Raman-pumped amplifier 18 is shown in FIG. 2. The amplifier 18 of FIG. 2 is somewhat simplified to avoid over-complicating the drawing. For example, amplifier 18 of FIG. 2 has only a single gain stage. This is merely illustrative. Amplifier 18 may have multiple gain stages. Amplifiers such as amplifier 18 may also have additional components such as variable optical attenuators, dispersion compensation modules, telemetry channel filters, isolators, pumps, taps, etc.

Raman gain and loss may be produced using Raman-pumped fiber such as Raman fiber 20. Raman fiber 20 may be optically pumped to produce optical gain and loss through stimulated Raman scattering. Raman fiber 22 may be any suitable optical fiber. Either distributed or discrete amplifier configurations may be used. For example, Raman fiber 22 may be single mode fiber that is part of span 16. Raman fiber 22 may also be a discrete coil of single mode fiber that has been optimized to produce a relatively large amount of Raman gain or loss per unit length of fiber or may be dispersion-compensating fiber. Dispersion-compensating fiber may be provided as a discrete coil in amplifier 18 or may be part of a transmission fiber span. Fiber that has a relatively small core area may sometimes be preferable to fiber that has a relatively large core area, because this improves Raman pumping efficiency.

Pump light from pump 22 may be coupled into Raman fiber 20 using fiber 30 and pump coupler 24. Pump couplers such as pump coupler 24 may be wavelength division multiplexing couplers or any other suitable pump couplers. If desired, pump coupling arrangements based on circulators may be used to pump Raman fiber 20.

Pump 22 may use any suitable source of pump light at multiple wavelengths. For example, pump 22 may use multiple diode lasers, each operating at a separate wavelength. Pump 22 may also use one or more tunable diode lasers, each of which is capable of tuning over a range of wavelengths. If desired, tunable or fixed-wavelength pumps based on fiber lasers may be used.

Control unit 26 may be used to control the Raman pump powers and wavelengths produced by pump 22 to produce a desired spectral gain shape for amplifier 18. Control unit 26 may be based on any suitable control electronics such as one or more microprocessors, microcontrollers, digital signal processors, programmable logic devices, application-specific integrated circuits, etc.

Figure 3:
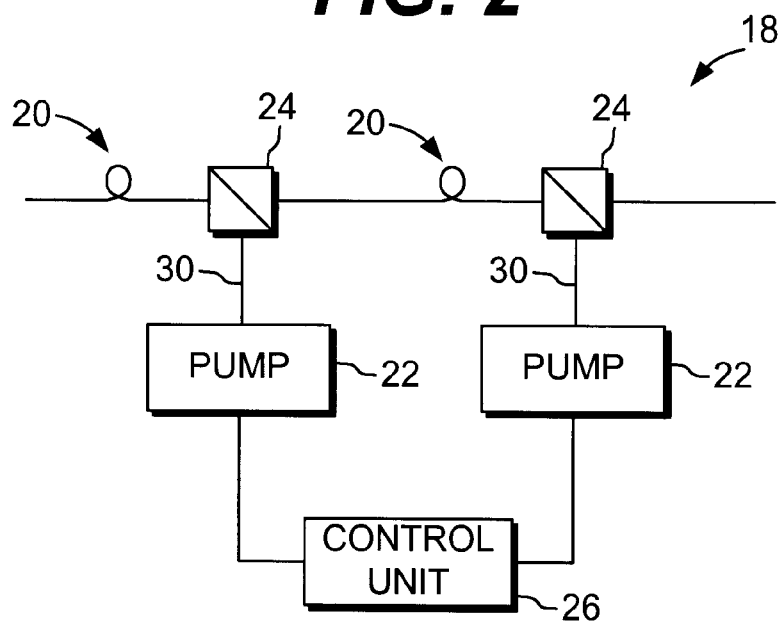
FIG. 3 is a schematic diagram of an illustrative Raman amplifier with multiple stages in accordance with the present invention.

A single control unit 26 may control each of the pumps 22 associated with the stages in an amplifier with multiple stages, as shown in FIG. 3. If desired, individual control units 26 may be used for each stage.

Figure 4:
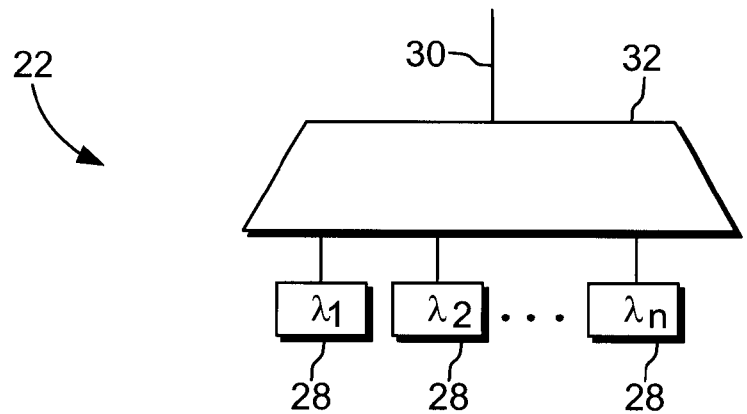
FIG. 4 is a schematic diagram of an illustrative pumping arrangement based on an optical multiplexer in accordance with the present invention.

A suitable arrangement for the pump 22 of amplifier 18 is shown in FIG. 4. In the example of FIG. 4, pump 22 is formed using multiple laser sources 28 (e.g., laser diodes or fiber lasers), each of which operates at a different wavelength. The outputs of sources 28 may be combined onto a single fiber path 30 using optical multiplexer 32. Multiplexer 32 may be an arrayed waveguide multiplexer or any other suitable multiplexer. Each source 28 may be formed from one or more laser diodes or fiber lasers.

Figure 5:
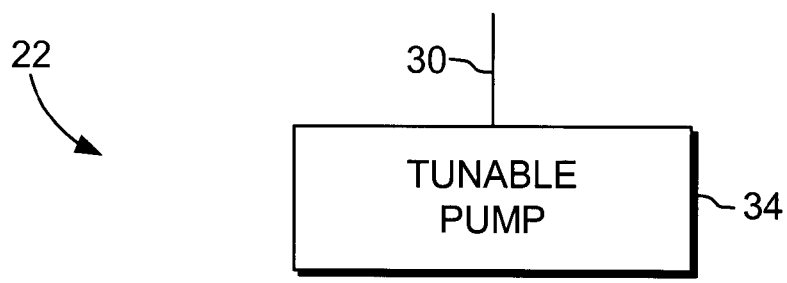
FIG. 5 is a schematic diagram of an illustrative pumping arrangement based on a tunable pump in accordance with the present invention.

Another suitable arrangement for the pump 22 of amplifier 18 is shown in FIG. 5. In the example of FIG. 5, pump 22 has a tunable pump 34. Tunable pump 34 may be based on any suitable tunable source of pump light such as a tunable diode laser source or tunable fiber laser. Multiple wavelengths of pump light may be produced by pump 34 by sequentially tuning pump 34 to each desired wavelength and simultaneously adjusting the drive current to pump 34. With this type of time division multiplexing, a single pump may be used to produce multiple pump wavelengths at different pump powers for pumping Raman fiber 20. If desired, a continuous range of pump wavelengths at different pump powers may be produced by continuously tuning and modulating a tunable laser.

Figure 6:
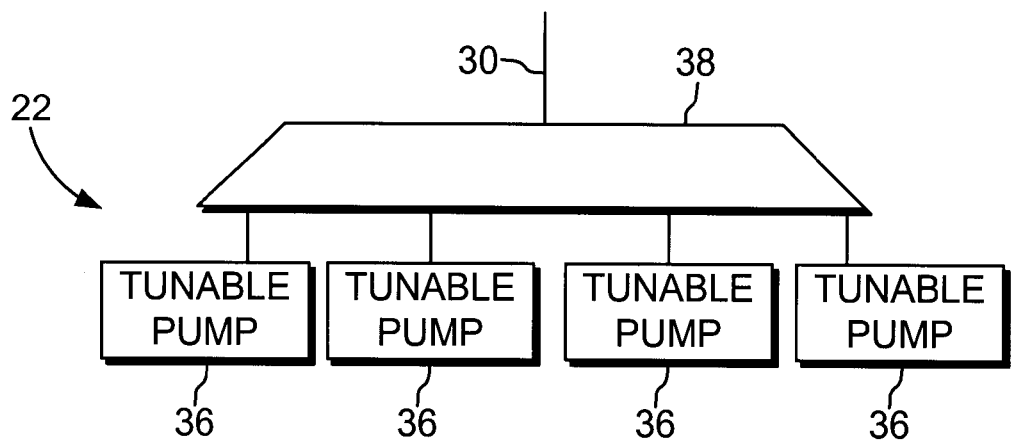
FIG. 6 is a schematic diagram of an illustrative pumping arrangement based on an optical multiplexer and tunable pumps in accordance with the present invention.

Pump 22 may be based on multiple tunable pump lasers as shown in FIG. 6. The outputs from tunable pumps 36 may be combined onto a single fiber path 30 using multiplexer 38. Tunable pumps 36 may each be tuned to a single desired wavelength or some or all of pumps 36 may be tuned to different pump wavelengths in sequence as with pump 34 of FIG. 5.

If desired, pump 22 may use a suitable combination of the arrangements of FIGS. 4, 5, and 6. The output of pump 22 may be polarized or unpolarized. Using an unpolarized pump may help to reduce polarization-dependent effects in amplifier 18.

Figure 7:
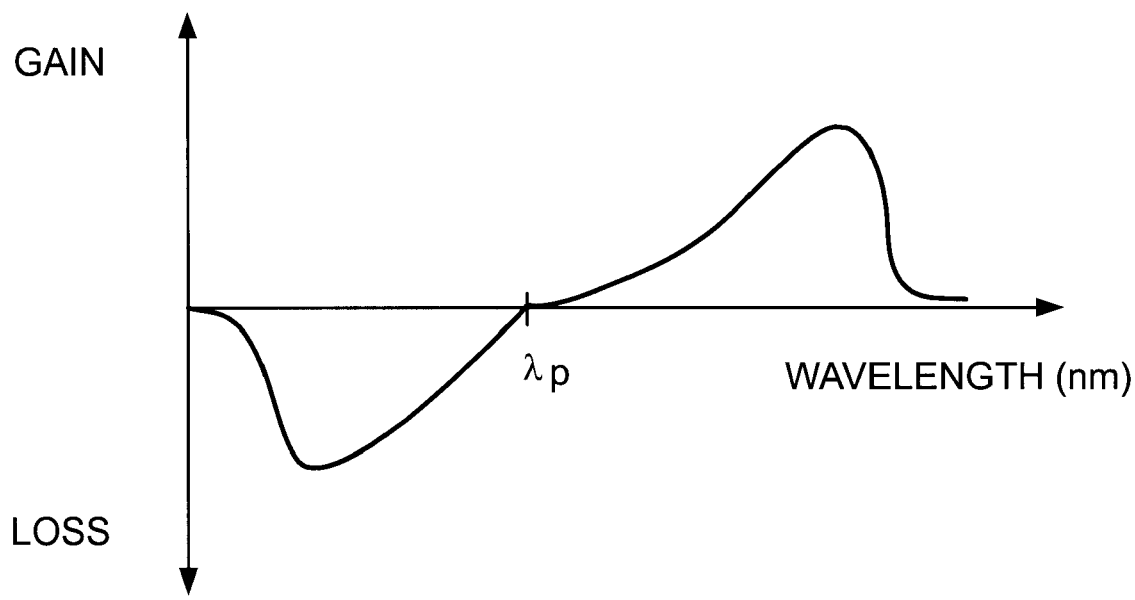
FIG. 7 is a graph of an illustrative Raman gain and loss spectrum that is produced when using a single pump wavelength in accordance with the present invention.

Each pump wavelength produced by pump 22 may produce a Raman gain and loss spectrum in fiber 20 of the type shown in FIG. 7. Below the pump wavelength of $\lambda_p$ fiber 20 exhibits Raman-induced loss. The power of signals in this wavelength region is converted into power at the pump wavelength. Above the pump wavelength of $\lambda_p$ fiber 20 exhibits Raman gain. The power of signals in this wavelength region is amplified as pump power is converted a into signal power.

In operation, fiber 20 is pumped using multiple pump wavelengths at various pump powers, each with an associated spectrum of the type shown in FIG. 7. The amplifier spectrum produced by fiber 20 results from the combination of each of these individual pump spectra. Because the pump wavelengths and powers may be controlled by control unit 26, the spectrum of amplifier 18 may be adjusted in real time if desired. Control unit 26 may also use feedback or other control techniques to ensure the amplifier gain spectrum remains constant.

Figure 8:
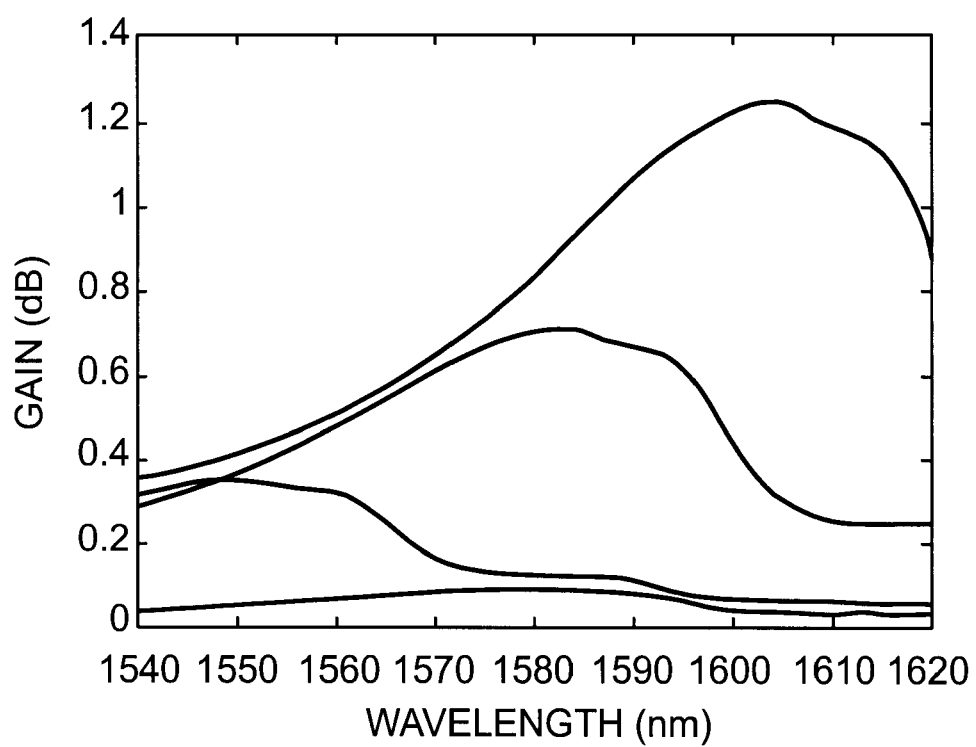
FIG. 8 is a graph showing illustrative gain spectrum contributions used in producing a flat amplifier gain spectrum in accordance with the present invention.

As just one illustrative example, a Raman amplifier 18 may be provided that has a flat gain spectrum in approximately the central portion of the 1540 nm to 1620 nm wavelength region. Four pump wavelengths at appropriate powers may be used that each produce Raman gain in this wavelength range. The spectral contributions of each of these four pumps is shown in FIG. 8. At the same time, four pump wavelengths at appropriate powers may be used that each produce Raman loss in this wavelength range. The spectra produced by these four pumps are shown in FIG. 9.

Figure 9:
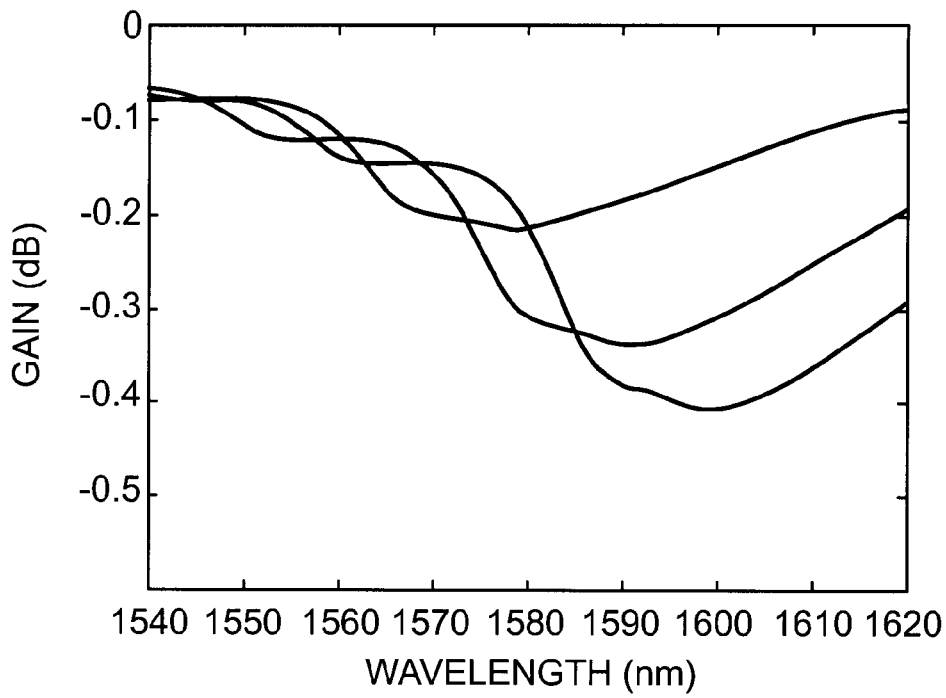
FIG. 9 is a graph showing illustrative loss spectrum contributions used in producing a flat amplifier gain spectrum in accordance with the present invention.
Figure 10:
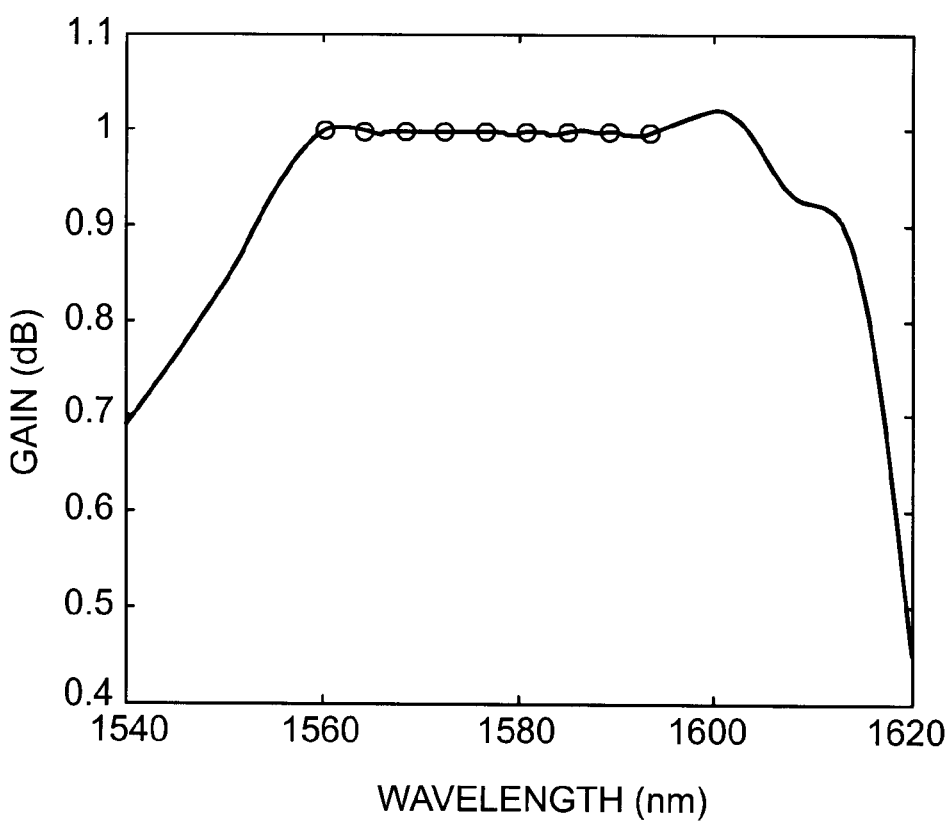
FIG. 10 is a graph showing the illustrative flat amplifier gain spectrum that results from combining the gain spectra of FIG. 8 with the loss spectra of FIG. 9 in accordance with the present invention.

The overall gain spectrum of amplifier 18 is determined by the combination of each of the Raman gain spectra of FIG. 8 and each of the Raman loss spectra of FIG. 9. As shown in FIG. 10, the resulting amplifier gain spectrum has a flat portion from approximately 1560 nm to 1600 nm. The gain spectrum of FIG. 10 is merely illustrative and has been chosen to demonstrate how amplifier 18 may be used to create a flat gain spectrum. Any desired spectrum may be provided in any suitable wavelength range.

The pump wavelengths and relative pump powers that may be used by pump 22 of amplifier 18 to produce the spectrum of FIG. 10 are given in table 1.

TABLE 1

| Wavelength (nm) | Pump Power (a.u.) |
|---|---|
| 1450.0 | 0.1418 |
| 1475.0 | 0.0363 |
| 1478.6 | 0.2848 |
| 1497.1 | 0.5015 |
| 1697.6 | 0.0741 |
| 1707.3 | 0.0031 |
| 1712.1 | 0.1179 |
| 1722.0 | 0.1413 |

The shortest four wavelengths in table 1 produce gain in the region from approximately 1560 nm to 1600 nm. The longest four wavelengths in table 1 produce loss in this region.

The pump wavelengths of table 1 may be produced using any suitable pumping arrangement. With a fixed group of pump sources, each pump source may be simultaneously driven at the appropriate power for that pump. With a pump arrangement that uses a tunable source, the tunable source may be selectively tuned to each of the wavelengths shown in table 1 while modulating the drive power accordingly.

The pump powers and pump wavelengths that are needed to produce a desired amplifier spectrum may be calculated by determining the appropriate contributions from each pump spectrum using information on the Raman spectral shape shown in FIG. 7. If desired, cross-pumping effects may be taken into account when determining the appropriate pump powers. Any suitable number of pump wavelengths may be used. When more pump wavelengths are used, a wider and flatter gain spectrum may be produced (within the limits imposed by the characteristic Raman spectral shape). When fewer pump wavelengths are used, system complexity may be reduced.

It will be understood that the foregoing is merely illustrative of the principles of this invention, and that various modifications can be made by those skilled in the art without departing from the scope and spirit of the invention.

What is claimed is:

1. An optical amplifier that provides gain for optical signals on channels at different wavelengths in a range of wavelengths in a fiber-optic communications link, comprising:

Raman-pumped fiber; and a Raman pump that optically pumps the Raman-pumped fiber at multiple pump wavelengths, wherein at least one of the pump wavelengths creates Raman gain in the range of wavelengths and wherein at least one of the pump wavelengths creates Raman loss in the range of wavelengths.

2. The optical amplifier defined in claim 1 wherein the Raman-pumped fiber comprises a span of transmission fiber.

3. The optical amplifier defined in claim 1 wherein the Raman-pumped fiber comprises at least one coil of fiber.

4. The optical amplifier defined in claim 1 wherein the Raman-pumped fiber comprises at least one coil of dispersion-compensating fiber.

5. The optical amplifier defined in claim 1 wherein the Raman pump comprises multiple diode lasers.

6. The optical amplifier defined in claim 1 wherein the Raman pump comprises multiple diode lasers and wherein at least some of the multiple diode lasers operate at different pump wavelengths.

7. The optical amplifier defined in claim 1 wherein the Raman pump comprises at least one tunable laser.

8. The optical amplifier defined in claim 1 wherein the Raman-pumped fiber comprises a span of transmission fiber and wherein the Raman pump comprises multiple diode lasers.

9. The optical amplifier defined in claim 1 wherein the Raman-pumped fiber comprises a span of transmission fiber, wherein the Raman pump comprises multiple diode lasers, and wherein at least some of the multiple diode lasers operate at different pump wavelengths.

10. The optical amplifier defined in claim 1 wherein the Raman-pumped fiber comprises a span of transmission fiber and wherein the Raman pump comprises a tunable laser.

11. The optical amplifier defined in claim 1 wherein the Raman-pumped fiber comprises at least one coil of fiber and wherein the Raman pump comprises multiple diode lasers.

12. The optical amplifier defined in claim 1 wherein the Raman-pumped fiber comprises at least one coil of fiber, wherein the Raman pump comprises multiple diode lasers, and wherein at least some of the multiple diode lasers operate at different pump wavelengths.

13. The optical amplifier defined in claim 1 wherein the Raman-pumped fiber comprises at least one coil of fiber and wherein the Raman pump comprises a tunable laser.

14. The optical amplifier defined in claim 1 wherein the Raman-pumped fiber comprises at least one coil of dispersion-compensating fiber and wherein the Raman pump comprises multiple diode lasers.

15. The optical amplifier defined in claim 1 wherein the Raman-pumped fiber comprises at least one coil of dispersion-compensating fiber, wherein the Raman pump comprises multiple diode lasers, and wherein at least some of the multiple diode lasers operate at different pump wavelengths.

16. The optical amplifier defined in claim 1 wherein the Raman-pumped fiber comprises at least one coil of dispersion-compensating fiber and wherein the Raman pump comprises a tunable laser.

17. The optical amplifier defined in claim 1 wherein the Raman pump wavelengths produced by the Raman pump create a flat gain spectrum in the Raman-pumped fiber.

18. The optical amplifier defined in claim 1 wherein the Raman pump wavelengths produced by the Raman pump create a flat gain spectrum in the Raman-pumped fiber in at least the wavelength range of 1560 to 1600 nm.

19. The optical amplifier defined in claim 1 further comprising a control unit that controls the Raman pump.

20. The optical amplifier defined in claim 1 further comprising a control unit, wherein the Raman pump wavelengths produced by the Raman pump create a gain spectrum in the Raman pumped fiber and wherein the gain spectrum is adjusted in real time by using the control unit to control the Raman pump.

21. The optical amplifier defined in claim 1 wherein a plurality of the pump wavelengths create Raman gain in the range of wavelengths and wherein a plurality of the pump wavelengths create Raman loss in the range of wavelengths.

* * * * *